(12) United States Patent
Wheeler et al.

(10) Patent No.: US 8,001,310 B2
(45) Date of Patent: Aug. 16, 2011

(54) SCALABLE COMPUTER NODE HAVING AN EXPANSION MODULE THAT IS SOCKET-COMPATIBLE WITH A CENTRAL PROCESSING UNIT

(75) Inventors: Andrew R. Wheeler, Ft. Collins, CO (US); Mark E. Shaw, Sammamish, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 156 days.

(21) Appl. No.: 12/397,610

(22) Filed: Mar. 4, 2009

(65) Prior Publication Data

US 2010/0228900 A1    Sep. 9, 2010

(51) Int. Cl.
G06F 13/00 (2006.01)
G06F 15/16 (2006.01)

(52) U.S. Cl. ............ 710/300; 709/249; 709/253

(58) Field of Classification Search .......... 710/104, 710/105, 300–305; 709/249, 251, 253, 220
See application file for complete search history.

(56) References Cited

U.S. PATENT DOCUMENTS

| | | | |
|---|---|---|---|
| 5,490,279 A * | 2/1996 | Golbert et al. ............... 712/1 |
| 5,848,250 A * | 12/1998 | Smith et al. ............... 710/300 |
| 5,918,023 A * | 6/1999 | Reeves et al. ............... 710/301 |
| 5,983,297 A * | 11/1999 | Noble et al. ............... 710/312 |
| 6,003,100 A * | 12/1999 | Lee ............... 710/301 |
| 6,026,456 A * | 2/2000 | Ilkbahar ............... 710/100 |
| 6,067,596 A * | 5/2000 | Nguyen et al. ............... 710/306 |
| 6,516,373 B1 * | 2/2003 | Talbot et al. ............... 710/301 |
| 6,535,939 B1 * | 3/2003 | Arimilli et al. ............... 710/116 |
| 6,711,639 B1 * | 3/2004 | Singer et al. ............... 710/100 |
| 6,990,545 B2 * | 1/2006 | Arimilli et al. ............... 710/302 |
| 6,998,870 B1 * | 2/2006 | Gulick et al. ............... 326/30 |
| 7,596,650 B1 * | 9/2009 | Aditya et al. ............... 710/301 |
| 2001/0018721 A1 * | 8/2001 | McKenna et al. ............... 710/126 |
| 2007/0079041 A1 | 4/2007 | Yang |
| 2007/0214299 A1 * | 9/2007 | Lo ............... 710/301 |

FOREIGN PATENT DOCUMENTS

WO    WO 01/24029    4/2001

OTHER PUBLICATIONS

Piranha: A Scalable Architecture Based on Single-Chip Multiprocessing by Luiz Andre Barroso et al., Proceedings of the 27th Annual International Symposium on Computer Architecture, Jun. 2000, pp. 1-12.

Chip Level Multiprocessing by Siwiki, http://www.solarisinternals.com/wiki/index.php/Chip_Level_Multiprocessing, 7 pages, Jun. 21, 2006.

* cited by examiner

*Primary Examiner* — Mark Rinehart
*Assistant Examiner* — Trisha Vu

(57) ABSTRACT

A scalable computer node includes a first central processing unit (CPU), a memory subsystem, and a socket that is configured to receive a second CPU. An expansion module is mounted in the socket instead of the second CPU, where the expansion module is socket-compatible with the second CPU. The expansion module has a CPU interface to communicate with the first CPU, a memory interface to communicate with the memory subsystem, and a fabric interface to communicate over a communications fabric with an expansion electronic subsystem to expand a capacity of the computer node.

12 Claims, 4 Drawing Sheets

SCALABLE COMPUTER NODE HAVING AN EXPANSION MODULE THAT IS SOCKET-COMPATIBLE WITH A CENTRAL PROCESSING UNIT

BACKGROUND

Typically, the amount of resources (such as processing, memory, or input/output resources) that can be included in a computer is subject to various constraints. For computers that are marketed to consumers for personal use, a price-to-performance constraint determines the amount of resources that can be included in such computers. In other words, the price that can be charged for computers may limit the amount of resources that can be included.

Other constraints that can be placed on computer performance include physical constraints such as the overall size of an enclosure in which computing components are included. A smaller enclosure means that a reduced number of resources can be contained in such enclosure.

If a user of a computer decides to later enhance (or otherwise modify) the performance capability of a computer, the options available to the user are relatively limited. Examples of typical options that may be available to a user include adding additional memory (or replacing existing memory with larger capacity memory), replacing a central processing unit (CPU) with a higher performance CPU, or upgrading or adding input/output (I/O) devices.

However, such conventional techniques of modifying the capabilities of computers lack flexibility.

BRIEF DESCRIPTION OF THE DRAWINGS

Some embodiments of the invention are described with respect to the following figures.

DETAILED DESCRIPTION

In accordance with some embodiments, a scalable computer node is provided that includes one or more central processing units (CPUs) and at least one CPU socket that is configured to receive another CPU. To enhance (or otherwise modify) the performance capacity of the computer node, an expansion module that is socket-compatible with a CPU is mounted in the CPU socket (instead of a CPU). The expansion module is considered to be "socket-compatible" with a CPU if the pins (or other types of electrical contacts) of the expansion module can be operationally connected in a CPU socket such that the expansion module can perform its intended tasks. A "CPU" or "central processing unit" refers to an integrated circuit chip having processing circuitry for performing processing functions. A CPU is different from a circuit board assembly having a circuit board on which one or more processors are mounted. "Enhancing," "expanding," or "modifying" the "performance capacity" (or more simply "capacity") of the computer node refers to changing the available resources that are available to the computer node to process requests made by entities of the computer node, including software entities such as software applications, operating systems, and so forth.

The expansion module once mounted in the CPU socket is able to communicate with an expansion electronic subsystem which is provided to enhance the performance capacity of the computer node. The expansion electronic subsystem can include additional one or more CPUs, additional memory, additional input/output (I/O) devices, additional storage devices, an accelerator device, a switch, and so forth. In fact, in some implementations, the expansion electronic subsystem can be a symmetrical multiprocessing (SMP) subsystem that has multiple CPUs and other electronic devices.

By using the expansion module according to some embodiments, a more flexible mechanism is provided to enhance or otherwise modify the capabilities of a computer node. As a result, a user of a computer node does not have to be constrained to use just the features that were originally part of the computer node, but rather, the user can flexibly add more or alternative features if so desired.

The expansion module has various interfaces to communicate with electronic devices (e.g., CPU(s), memory subsystem, I/O subsystem, etc.) in the computer node. In addition, the expansion module has another interface (referred to as a "scalable fabric interface") for connection to an expansion electronic subsystem. By using the expansion module that is socket-compatible with a CPU according to an embodiment, expansion of the performance capacity of a computer node is made more flexible and cost-effective.

Figure 1:
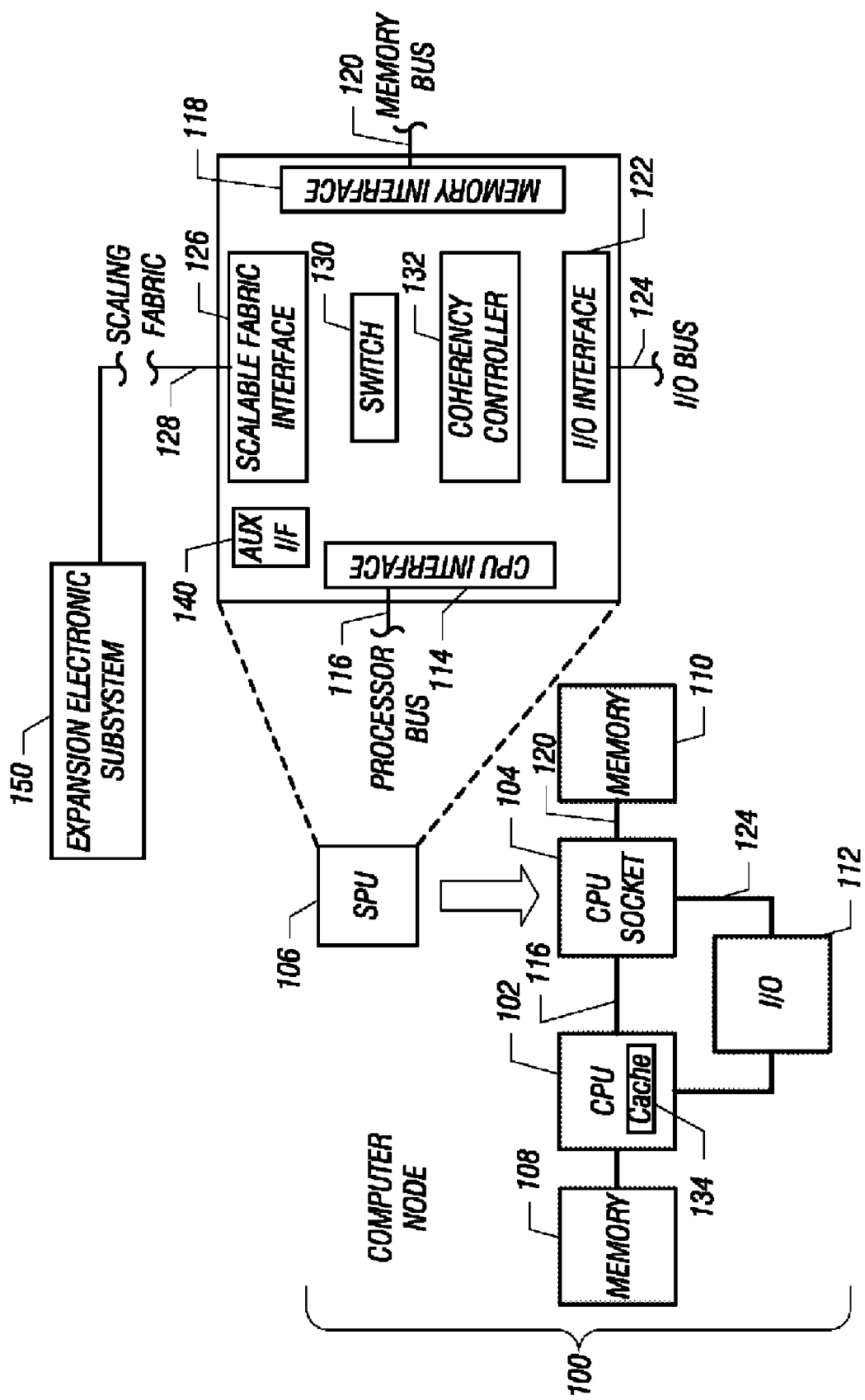
FIG. 1 is a block diagram of a scalable computer node that includes a scalable processing unit (SPU) according to an embodiment for enhancing a performance capability of the computer node.

FIG. 1 illustrates an exemplary computer node 100 that has a first CPU 102 and a CPU socket 104 that is capable of receiving a second CPU. Note that the first CPU 102 can also be received in a corresponding CPU socket, or alternatively, the first CPU 102 can be fixedly attached to a circuit board in the computer node 100. Initially, the computer node 100 can be configured with two CPUs, including the first CPU 102 and the second CPU (not shown) mounted in the CPU socket 104. Alternatively, the computer node 100 can be initially configured with just one CPU—the first CPU 102; in this alternative configuration, the CPU socket 104 is initially empty.

To enhance (or otherwise modify) the performance capacity of the computer node 100, an expansion module according to an embodiment can be mounted in the CPU socket 104; if the second CPU is initially mounted in the CPU socket 104, the second CPU can be first removed from the CPU socket 104 prior to mounting the expansion module in the CPU socket 104. In the ensuing discussion, the expansion module according to some embodiments is referred to as a scalable processing unit (SPU) 106.

The computer node 100 further includes a first memory subsystem 108 connected to the first CPU 102, and a second memory subsystem 110 connected to the CPU socket 104. In addition, the computer node 100 includes an I/O subsystem 112 that is connected to the CPU 102 and the CPU socket 104. Although two memory subsystems 108 and 110 are shown in FIG. 1, it is noted that in an alternative implementation, just one memory subsystem can be provided.

Each memory subsystem 108, 110 can include one or more memory devices, such as dynamic random access memories (DRAMs), static random access memories (SRAMs), flash memories, or other types of integrated circuit (IC) memory devices. The I/O subsystem 112 can include one or more I/O devices, such as a network interface controller, a video subsystem, an audio subsystem, and so forth.

As further depicted in FIG. 1, the SPU 106 includes a CPU interface 114 for communicating over a processor bus 116 with the CPU 102. The SPU 106 also includes a memory interface 118 for communicating with the memory subsystem 110 over a memory bus 120. In addition, the SPU 106 includes an I/O interface 122 for communicating over an I/O bus 124 with the I/O subsystem 112.

Moreover, the SPU 106 includes a scaling fabric interface 126 for communicating over a scaling communications fabric 128 with an expansion electronic subsystem 150. A "scaling communications fabric" refers to any one of a communications link, bus, or network (wired or wireless) that allows the SPU 106 to communicate with the expansion electronic subsystem 150. As examples, the scaling communications fabric 128 can be implemented with a flexible cable, such as an electrical cable or an optical cable, an optical link such as a waveguided optical beam, or any other transport mechanism (whether wired or wireless).

In another embodiment, an auxiliary interface 140 can also be provided. The auxiliary interface 140 can be used to provide management tasks, such as power control or throttling, fan speed control, remote login and control, diagnostics, and so forth. Management-related commands and data can be communicated over the scaling fabric 128 (such as by tunneling such management-related commands and data) to a remote management system. Alternatively, the management-related commands and data can be communicated over auxiliary channels that are part of the scaling fabric 128 or that are separate from the scaling fabric 128, where the auxiliary channels are dedicated to communicating management-related commands and tasks.

In addition to the interfaces 114, 118, 122, and 126, the SPU 106 also includes a switch 130 to allow for communication among the various interfaces 114, 118, 122, and 126. For example, the SPU 106 may receive a request from the first CPU 102 for data contained in the memory subsystem 110. This request is provided through the CPU interface 114 and the switch 130 to the memory interface 118. The data retrieved from the memory subsystem 110 is returned through the memory interface 118 and the switch 130 to the CPU interface 114.

Another component of the SPU 106 is a cache coherency controller 132. The computer node 100 may include one or more cache memories, including a cache memory 134 in the first CPU 102. The computer node may also include a second level cache memory (not shown). Moreover, the expansion electronic subsystem 150 to which the SPU 106 is connected can also include one or more cache memories, either cache memories contained within a CPU or external cache memory.

The cache coherency controller 132 in the SPU 106 is used to maintain the integrity (coherency) of data stored in various shared cache memories throughout the system, where the "system" includes the computer node 100 as well as the expansion electronic subsystem 150. Maintaining the integrity of data contained in the shared cache memories involves keeping track of data that has been modified (dirty data) and ensuring that such modified data is provided (instead of unmodified data) in response to requests.

Figure 2:
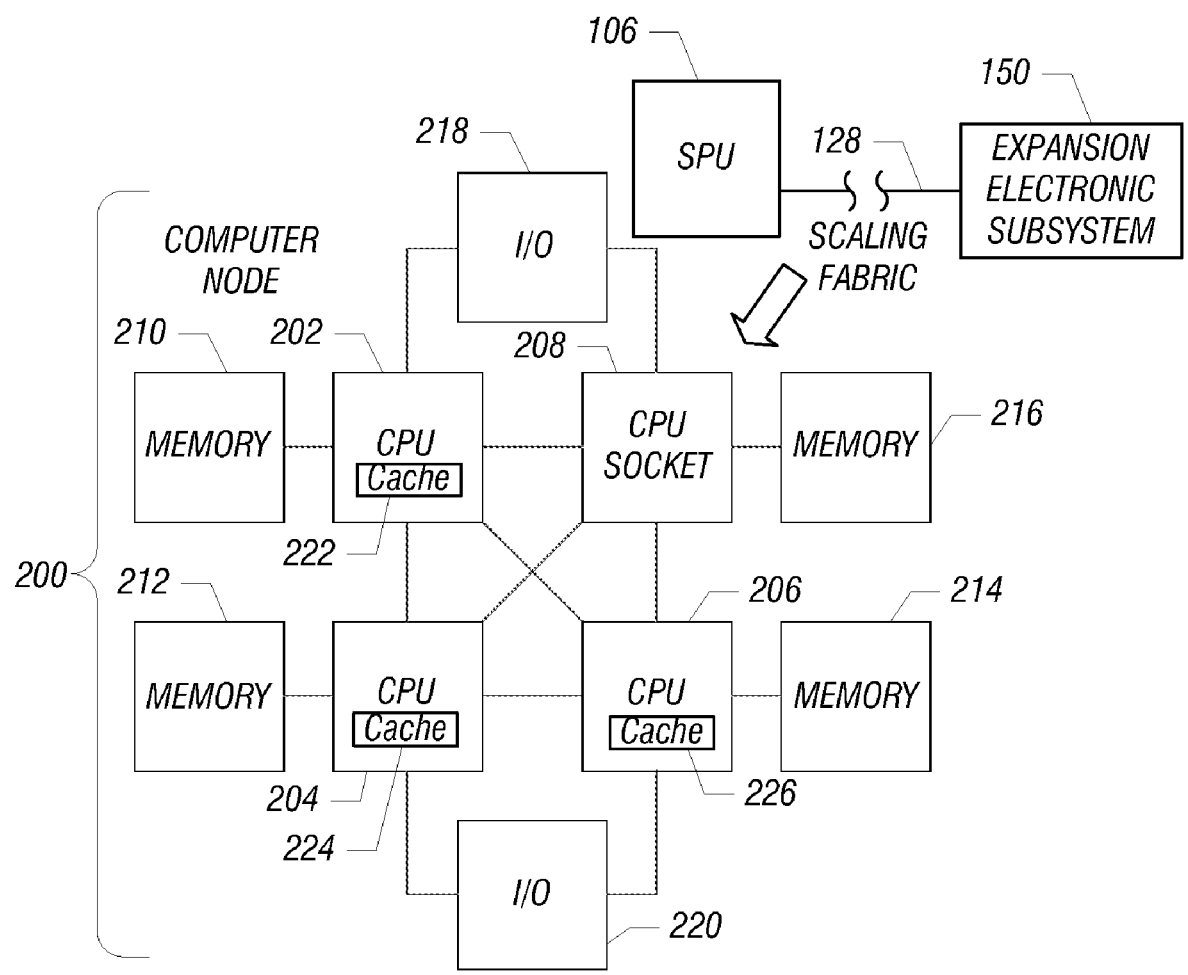
FIG. 2 is a block diagram of another computer node that has a scalable processing unit according to an embodiment.

FIG. 1 shows an example of a computer node 100 that is a two-CPU computer node. FIG. 2 shows an alternative implementation that includes a four-CPU computer node 200. The computer node 200 includes first, second, and third CPUs 202, 204, 206 (containing respective cache memories 222, 224, and 226) as well as a CPU socket 204 that is capable of receiving a fourth CPU. Initially, the CPU socket 208 can be empty, or alternatively, the fourth CPU can be mounted in the CPU socket 208. Note that the other CPUs 202, 204, and 206 can similarly be mounted in corresponding CPU sockets, or alternatively, the other CPUs 202, 204, and 206 are fixedly mounted to a circuit board in the computer node 200.

To enhance (or otherwise modify) the capacity of the computer node 200, the SPU 106 can be mounted in the CPU socket 208. If the fourth CPU was initially mounted in the CPU socket 208, the fourth CPU is first removed before mounting the SPU 106. Note that instead of mounting the SPU 106 in the CPU socket 208, the SPU 106 can be mounted in any of the other CPU sockets in which the CPUs 202, 204, and 206 are mounted. As depicted in FIG. 2, the SPU 106 is connected over the scaling communications fabric 128 to the expansion electronic subsystem 150.

As further depicted in FIG. 2, the CPUs 202, 204, 206 are connected to respective memory subsystems 210, 212, and 214. The CPU socket 208 is connected to memory subsystem 216. The CPU 202 and CPU socket 208 are connected to a first I/O subsystem 218, and the CPUs 204 and 206 are connected to a second I/O subsystem 220.

Each CPU is capable of being connected to three other CPUs. For example, the CPU 202 can be connected to CPU 204, CPU 206, and a CPU mounted in CPU socket 208. If instead the SPU 106 is mounted in the CPU socket 208, the CPU 202 then communicates with the SPU 106.

The SPU 106 when mounted in the CPU socket 208 is also capable of communicating with three CPUs (202, 204, and 206). The CPU interface 114 (FIG. 1) of the SPU 106 can communicate over three different processor buses with three corresponding CPUs; alternatively, the SPU 106 can be provided with multiple CPU interfaces to communicate with corresponding CPUs over respective processor buses.

Figure 3A:
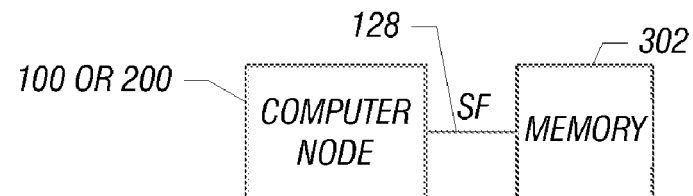
FIGS. 3A-3F are block diagrams that illustrate connections of the computer node of FIG. 1 or FIG. 2 to various expansion electronic subsystems using the SPU according to some embodiments.
Figure 3B:
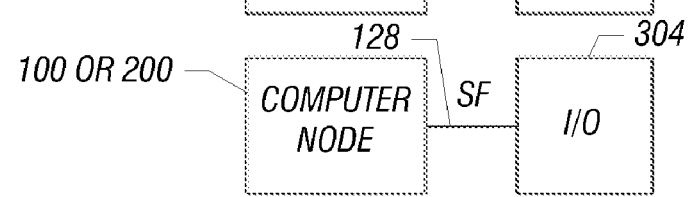
Figure 3C:
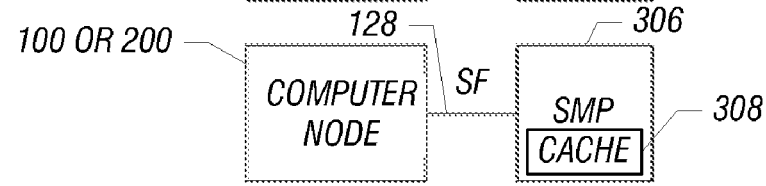

FIGS. 3A-3F illustrate possible connections of the computer node 100 or 200 to different expansion electronic subsystems over the scaling communications fabric 128 through the SPU 106 that is mounted in a CPU socket of the computer node 100 or 200. FIG. 3A shows the computer node 100 or 200 connected to an expansion memory subsystem 302 (which includes one or more memory devices). FIG. 3B shows the computer node 100 or 200 connected to an expansion I/O subsystem 304 (which includes one or more I/O devices). FIG. 3C shows the computer node 100 or 200 connected to an expansion SMP subsystem 306, where the SMP subsystem can include multiple CPUs, as well as one or more cache memories 308.

Figure 3D:
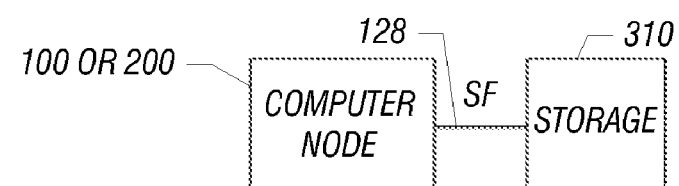
Figure 3E:
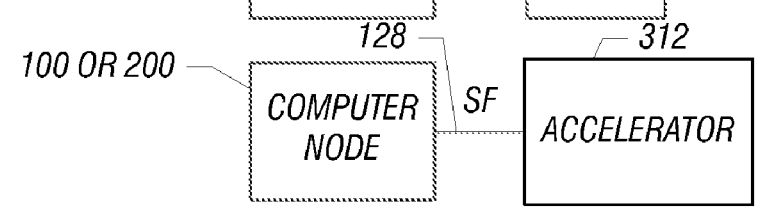

FIG. 3D shows the computer node 100 or 200 connected over the scaling communications fabric 128 to an expansion storage subsystem 310, and FIG. 3E shows the computer node 100 or 200 connected to an expansion accelerator subsystem 312. The accelerator subsystem 312 includes an accelerator device to which functions for software applications (such as encryption/decryption, graphics processing, and so forth) can be offloaded to reduce loading on the main CPU(s).

Figure 3F:
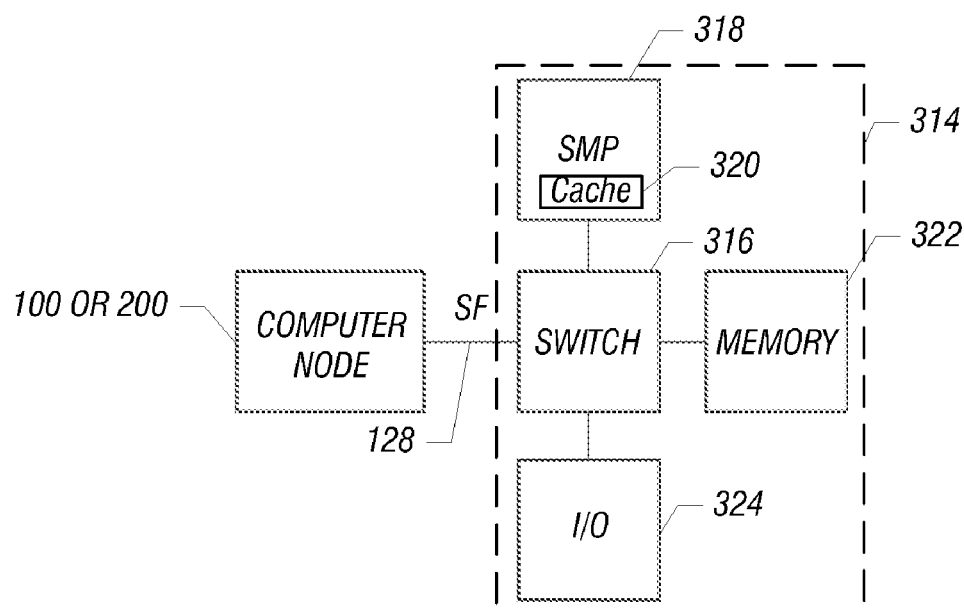

FIG. 3F shows the computer node 100 or 200 connected over the scaling communications fabric 128 to an expansion electronic subsystem 314 that includes an expansion switch module 316 connected to multiple electronic subsystems, including an SMP subsystem 318 (that includes multiple CPUs and cache memories 320), a memory subsystem 322, and an I/O subsystem 324.

Scaling of the computer node can be performed at multiple hierarchical levels. If the SMP subsystem 306 or 318 shown in FIG. 3C or 3F is considered another computer node with a CPU socket capable of receiving an SPU, then the SMP subsystem 306 or 308 can further accept an additional SPU for enhancing the performance capacity of the SMP subsystem 306 or 308. The additional SPU can in turn be connected to a further expansion electronic subsystem. Such expansion can continue hierarchically with additional SPUs. In this manner, a user can flexibly expand the performance capacity of a computer node using one or more SPU(s) connected to respective one or more expansion electronic subsystems over one or more scaling communications fabrics.

Figure 4:
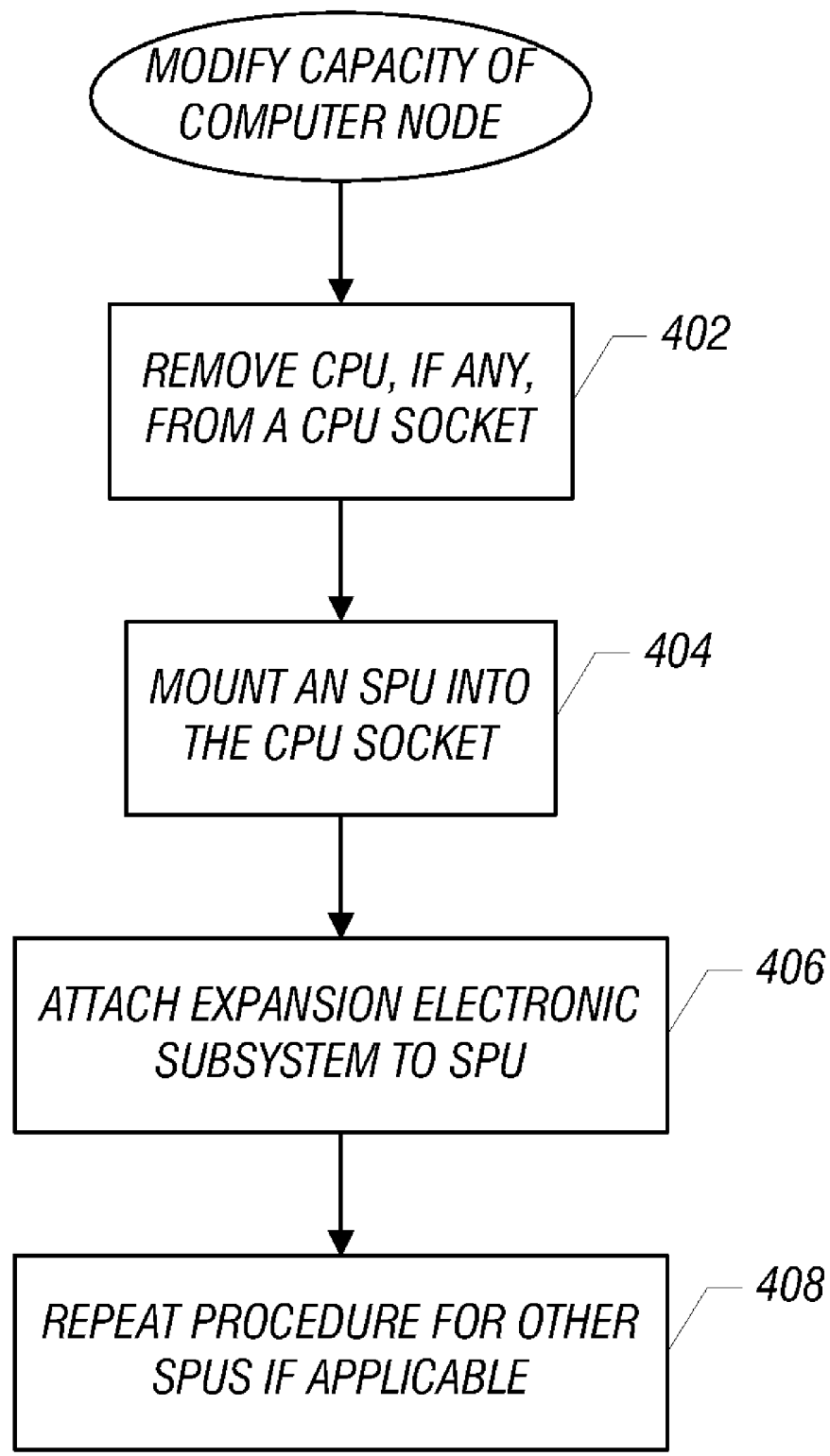
FIG. 4 is a flow diagram of a process of enhancing (or otherwise modifying) the performance capacity of a computer node, in accordance with an embodiment.

FIG. 4 shows an example procedure for modifying the capacity of a computer node (100 or 200). First, for a given CPU socket that has been identified to receive an SPU, the corresponding CPU (if any) is removed (at 402) from the CPU socket (e.g., socket 104 or socket 208 in FIG. 1 or 2). Next, an SPU is mounted (at 404) into the identified CPU socket. Then, an expansion electronic subsystem is attached (at 406) to the SPU. Once the expansion electronic subsystem is attached to the SPU, the additional functions provided by the expansion electronic subsystem are available to the computer node. The procedure above is repeated (at 408) for other SPUs, if applicable.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A scalable computer node comprising:
   a first central processing unit (CPU);
   a memory subsystem;
   a socket that is configured to mount a second CPU that is different from a circuit board assembly having a circuit board; and
   a first expansion module mounted in the socket instead of the second CPU, wherein the first expansion module is socket-compatible with the second CPU, and wherein the first expansion module has a CPU interface to communicate with the first CPU, a memory interface to communicate with the memory subsystem, and a fabric interface to communicate over a communications fabric with an expansion electronic subsystem that includes at least another CPU to expand a capacity of the computer node and that includes a second socket to mount a second expansion module having a CPU interface to communicate with the another CPU, and a fabric interface to communicate over a second communications fabric with another expansion electronic subsystem to modify the capacity of the computer node.

2. The scalable computer node of claim 1, further comprising an input/output (I/O) subsystem, wherein the first expansion module further includes an I/O interface to communicate with the I/O subsystem.

3. The scalable computer node of claim 1, wherein the fabric interface of the first expansion module is to communicate over one of an electrical cable and an optical link.

4. The scalable computer node of claim 1, wherein the first expansion module further includes a cache coherency controller to maintain integrity of one or more shared caches in a system that includes the computer node and the expansion electronic subsystem.

5. A method of modifying a capacity of a computer node, comprising:
   mounting an expansion module into a socket of the computer node, wherein the computer node further includes a first central processing unit (CPU), wherein the socket is configured to receive a second CPU, wherein the expansion module is mounted in the socket in place of the second CPU, wherein the expansion module is socket-compatible with the second CPU, wherein the expansion module has a CPU interface to communicate with the first CPU, and a fabric interface to communicate over a communications fabric with an expansion electronic subsystem to modify the capacity of the computer node, and wherein the expansion electronic subsystem includes at least another CPU and another CPU socket; and
   mounting a second expansion module in the another CPU socket, wherein the second expansion module has a CPU interface to communicate with the another CPU, and a fabric interface to communicate over a second communications fabric with another expansion electronic subsystem to modify the capacity of the computer node.

6. The method of claim 5, wherein the socket of the computer node is initially empty, and wherein mounting the expansion module comprises mounting the expansion module in the initially empty socket.

7. The method of claim 5, wherein the socket of the computer node is initially occupied by the second CPU, the method further comprising:
   removing the second CPU from the socket of the computer node; and
   mounting the expansion module into the socket of the computer node after removing the second CPU.

8. The method of claim 7, wherein the second CPU that initially occupied the socket of the computer node is different from a circuit board assembly having a circuit board on which one or more processors are mounted.

9. A system comprising:
   a scalable computer node comprising:
      a first central processing unit (CPU);
      a memory subsystem;
      a socket that is configured to mount a second CPU that is different from a circuit board assembly having a circuit board;
      an expansion module mounted in the socket instead of the second CPU, wherein the expansion module is socket-compatible with the second CPU, and wherein the expansion module has a CPU interface to communicate with the first CPU, a memory interface to communicate with the memory subsystem, and a fabric interface; and
   an expansion electronic subsystem to communicate with the expansion module through the fabric interface of the expansion module, wherein the expansion electronic subsystem is a multiprocessing system that has a plurality of processors, wherein the expansion electronic subsystem further comprises a second socket configured to mount another CPU that is different from a circuit board;
   a second expansion module mounted in the second socket instead of the another CPU; and a second expansion electronic subsystem to communicate with the second expansion module, wherein the second expansion electronic subsystem has one or more electronic devices to expand a capacity of the computer node.

10. The system of claim 9, wherein the expansion electronic subsystem further comprises one or more of a memory subsystem, an input/output subsystem, a storage subsystem, and an accelerator subsystem.

11. The system of claim 9, wherein the expansion electronic subsystem further includes a switch and a memory subsystem wherein the switch interconnects the memory subsystem and multiprocessing system to the computer node.

12. The system of claim 9, further comprising cache memories, wherein the expansion module includes a cache coherency controller to maintain integrity of the cache memories.

* * * * *